United States Patent [19]

Abe

[11] Patent Number: 5,504,535
[45] Date of Patent: Apr. 2, 1996

[54] TELEVISION RECEIVER FOR DISPLAYING TWO PICTURES OF SIMILAR OR DIFFERENT ASPECT RATIOS SIMULTANEOUSLY

[75] Inventor: Hirotoshi Abe, Saitama, Japan

[73] Assignee: Kabushiki Kaisha Toshiba, Kawasaki, Japan

[21] Appl. No.: 361,483

[22] Filed: Dec. 22, 1994

[30] Foreign Application Priority Data

Dec. 24, 1993 [JP] Japan ................... 5-328910

[51] Int. Cl.$^6$ ................. H04N 5/45; H04N 5/46
[52] U.S. Cl. ............ 348/565; 348/567; 348/568; 348/588; 348/598; 348/556
[58] Field of Search ................... 348/584, 586, 348/588, 555, 556, 557, 564, 565, 566, 567, 568, 598, 599, 445, 913; 358/704, 183, 22, 241 P; H04N 5/262, 5/45, 5/445, 5/46, 3/223, 5/265

[56] References Cited

U.S. PATENT DOCUMENTS 5,287,188  2/1994  Saeger ................... 348/565

FOREIGN PATENT DOCUMENTS 5328245  12/1993  Japan .

*Primary Examiner*—James J. Groody
*Assistant Examiner*—Sherrie Hsia
*Attorney, Agent, or Firm*—Cushman, Darby & Cushman

[57] ABSTRACT

A display is to be produced based on video signals having aspect ratios of 4:3 and 16:9. Controller 21 turns on switches SW1 and SW2 so that the digitalized video signal of the first picture is compressed at a rate of 3/8 in the time axis. Simultaneously, the video signal of the second picture is converted digitally, written into memory 14 in synchronization with the first picture video signal, read out based on a delay of 3H/8 from the synchronization with the first picture video signal, and sent to a digital processing circuit 13. The controller 21 controls the digital processing circuit 13 so as to compress in the time axis the video signal of the second picture at a compressing rate of 5/8. Also, the controller 21 controls a vertical amplitude switching signal generator 19 to adjust a vertical deflecting current in a deflecting circuit 18 based on an operation by the audience.

8 Claims, 6 Drawing Sheets

TELEVISION RECEIVER FOR DISPLAYING TWO PICTURES OF SIMILAR OR DIFFERENT ASPECT RATIOS SIMULTANEOUSLY

BACKGROUND OF THE INVENTION

1. Field of the Invention

This invention relates to a television receiver provided with a cathode ray tube having an aspect ratio of 16:9 at which a wide aspect broadcast can be received, and more particularly to a video processing circuit for processing two pictures wherein a picture having an aspect ratio of 4:3 (e.g., an NTSC system) and a picture having an aspect ratio of 16:9 of a wide aspect broadcast can both be displayed at the optimum aspect ratio in a television receiver by digitalizing and processing the video signal.

2. Description of the Related Arts

Recently, with the multi-purpose use of television receivers, the displayed picture is being widened. For example, a wide aspect television receiver (which shall be abbreviated as a wide aspect television hereinafter) for receiving satellite broadcasts (e.g. a hi-vision broadcast), wide aspect broadcasts (e.g. HD-MAC and PAL Plus), and general broadcasts (e.g. an ordinary NTSC system broadcast) as compatible with each other is noted.

As is well known, this wide aspect television is provided with a displayed picture (CRT) having an aspect ratio of 16:9 so that the audience may effectively obtain a present feel or pressing feel. Such conventional systems not only display a picture having a video having a 16:9 aspect ratio that is characterized by the hi-vision broadcast using a MUSE-NTSC converter or the like, they also display pictures of a video of the current broadcast having a 4:3 aspect ratio using the NTSC system. Additionally, an expanding function for expanding and displaying the video of the current broadcast having a 4:3 aspect ratio on the entire displayed picture surface of 16:9, and various functions of displaying the video having a 4.3 aspect ratio on the display picture surface having a 16:9 aspect ratio have been suggested.

With the well known digitalization of the video technique, a digital television receiver for processing a video signal using a digital signal has prevailed. For example, the functions of improving the picture quality by digitalizing the video processing circuit, displaying such pictures as parent and son pictures (two pictures display), displaying multi-pictures, and reproducing stationary pictures by applying memories have also become well known.

Thus, with the digitalization of the video technique, the wide aspect television can be provided with various functions. For example, by video-processing an analog signal (e.g. a broadcast signal) into a digital signal, that processed signal is expected to coexist with the hi-vision broadcast, satellite broadcast or current broadcast of the NTSC system.

Therefore, an example of block diagram of such wide aspect television is shown in FIG. 3.

FIG. 3 is a block diagram showing an example of block diagram of a conventional wide aspect television.

As shown in FIG. 3, the reference numeral 100 represents an input terminal which a broadcast signal of the NTSC system is fed. The video signal input from this input terminal 100 is fed to a video processing circuit 101 formed of at least video intermediate frequency amplifying and video detecting circuits (not illustrated), is converted to an intermediate frequency signal, and is taken out. Then this video signal is separated into a luminance signal Y (which shall be abbreviated as a Y signal hereinafter) and a chroma signal and then the chroma signal is demodulated to color difference signals (R-Y, B-Y).

The Y signal and color difference signals demodulated by the video processing circuit 101 are fed as analog signals to an A/D converting circuit 102 where they are converted to digital signals. The output signals of this A/D converting circuit 102 are fed to a time axis compressing circuit 103 that compresses the input signals at a predetermined compressing rate. After the digital signals are compressed at the predetermined compressing rate, they are fed to a D/A converting circuit 104. The digital signals compressed by the time axis compressing circuit 103 are converted to analog signals by this D/A converting circuit 104 and are fed to a video processing circuit 105. Then, the video signals compressed in the time axis are processed in the video by a video processing circuit 105 as in an ordinary television receiver, and the respective color difference signals and Y signal are added to obtain R (red), G (green) and B (blue) signals by matrix circuit 106. A CRT 107 is driven to display the picture compressed in the time axis with an aspect ratio of 16:9.

Now, considering the relationship between the compressing rate of the time axis compressing circuit 103 and the video displayed in the picture in the CRT 107, when an NTSC input video signal has an aspect ratio of 4:3 and is a circle 150, an ellipse 150a to be a horizontally long video will be displayed in the displayed picture of the CRT 107 having an aspect ratio of 16:9 if the video signal is not compressed by the time axis compressing circuit 103 (see FIG. 4(a)).

However, it is possible for the horizontally long video mentioned above to be displayed in a normal video. That is, a video having an aspect ratio of 4:3 (e.g. the above circle 150) can be displayed in a picture display having an aspect ratio of 16:9 by compressing the displayed video shown in the FIG. 4(a) at a predetermined compressing rate from right and left.

That is to say, as the video of the current broadcast (NTSC) having an aspect ratio of 4:3 can be displayed in the displayed picture of the CRT 107 having an aspect ratio of 16:9 as mentioned above, the predetermined compressing rate will be:

(9/3)×4/16=3/4.

That is to say, if the displayed video is compressed at a compressing rate of 3/4, a normal video of 4:3 can be displayed in the picture.

It is also well known that such video signal compressing process can be easily carried out using a digital signal and a digital processing circuit.

On the other hand, when the above video signal input is compressed at rate of 3/4 and displayed in the displayed picture of an aspect ratio of 16:9 (see FIG. 4 (b)), a part of no signal is produced on the right and/or left of the displayed picture of the CRT 107 as blank part 107a.

In order to effectively utilize blank part 107a and to restore the features of the wide aspect television, a function called a picture out picture function is used to display a son picture in the blank part 107a. That is, a function of a two pictures video is adopted.

FIG. 5 is a block diagram showing an example of wide aspect television provided with such two pictures video function.

As shown in FIG. 5, the video processing circuit group carrying out the two pictures video process comprises mostly a video processing circuit for displaying a parent/first picture (shown on the upper step in FIG. 5) and a video processing circuit for displaying a son/second picture (shown on the lower step in FIG. 5).

The video processing circuit shown on the lower step is generally a son picture video processing circuit for producing the second picture in the main first picture, for compressing the second picture video signal at a predetermined compressing rate, and for reproducing it as synchronized with the first picture.

The video processing circuit on the upper step is formed of substantially the same components as of the video processing circuit shown, for example, in FIG. 3. The difference is that a 1/2 compressing circuit 53 compressing the time axis at a compressing rate of 1/2 is provided and is characterized by being connected in parallel with a 3/4 compressing circuit 54.

In FIG. 5, reference numeral 50 represents an input terminal in which a broadcast signal of an NTSC system is to be input. The video signal input from this input terminal 50 is fed to a video signal processing circuit 51 formed of at least video intermediate frequency amplifying and video detecting circuits (not illustrated). It then is converted to an intermediate frequency signal, is taken out, and is separated into a luminance signal Y (which shall be abbreviated as a Y signal hereinafter) and a chroma signal. The chroma signal is demodulated to color difference signals (R-Y, B-Y).

The Y signal and color difference signals demodulated by the video processing circuit 51 are fed as analog signals to an A/D converting circuit 52 are converted to digital signals. The output signals of this A/D converting circuit 52 are fed to a time axis 1/2 compressing circuit 53 that compresses the input signals at a compressing rate of 1/2. The digital signals are compressed at a compressing rate of 1/2 are fed to the D/A converting circuit 55. Additionally, the output terminal of the A/D converting circuit 52 is connected to a time axis 3/4 compressing circuit 54 that compresses the time axis at a compressing rate of 3/4. The input digital signals compressed at a compressing rate of 3/4 are fed to the D/A converting circuit 55. The output signals of the 1/2 compressing circuit 53 and 3/4 compressing circuit 54 are switched by a switching means (not illustrated). For example, the picture having a 4:3 aspect ratio (NTSC) can be selected to be of a mode of displaying a picture having a 4:3 aspect ratio or of a mode of displaying two pictures. The switching means (not illustrated) is operated by a control signal from a controlling means (not illustrated).

The digital signals compressed by either the 1/2 compressing circuit 53 of 3/4 compressing circuit 54 are converted to analog signals by this converting circuit 55 and are fed to the video processing circuit 56. Thereafter, the video signal compressed in the time axis is video-processed by this video processing circuit 56 as in the ordinary television receiver. Additionally, the respectively color difference signals and Y signal are added to each other by using a matrix circuit 57 are, and fed to an adding means 58.

On the other hand, in the video processing circuit for displaying the son/second picture shown on the lower step, the video signal input from the two pictures video signal input terminal 59 is similarly processed, the digital signal of the second picture video is fed to a digital processing circuit 62 through a video processing circuit 60 and A/D converting circuit 61, and the fed signal temporarily memorized in a digital memory 63.

In the digital processing circuit 62, a clock pulse is produced from a synchronizing signals, for example, of the first picture and second picture. Also, signals are written into or read out of the digital memory 63 by the timing of this clock pulse. That is to say, they are read out by synchronizing the video signal of the second picture with the video signal of the first picture and 1/2 compressing and are subsequently output.

The output signal of the digital processing circuit 62 is converted to an analog signal from the digital signal by a D/A converting circuit 64. It is then fed to the adding means 58 through the video processing circuit 65 and RGB matrix circuit 66 in the manner mentioned above.

Therefore, when two pictures are displayed, the first picture video processing circuit 51 uses the 1/2 compressing circuit. The video signal compressed in the time axis at a 1/2 compressing rate in this 1/2 compressing circuit will be fed to the adding means 58. At the same time, the synchronization with the video signal of the first picture will lag by 1H/2 from the second picture video processing circuit 60, and the 1/2 compressed second video signal will fed to the adding means 58. The first video signal and second video signal will be added to each other by adding means 58, and this added synthetic video signal will drive CRT 67 having an aspect ratio of 16:9. Thereby, the two pictures video shown, for example, in FIG. 6(a) will be displayed in the CRT 67.

However, in this state, the displayed pictures obtained by dividing this displayed picture of 16:9 into two parts are shown in FIG. 6(a). That is, the first and second pictures having an aspect ratio of 8:9 will be displayed in the pictures of the CRT 67 having an aspect ratio of 16:9 so that vertically long videos will displayed.

Therefore, when a synchronous signal is detected by the video processing circuit 51 and adjusted in vertical amplitude by a deflecting means (not illustrated) on the basis of this synchronous signal, the video in such state will be made a normal video. That is, the first and second displayed pictures will be of an aspect ratio of 4:3. For example, when the vertical amplitude is compressed in size by 2/3, a two picture display is achieved as is shown in FIG. 6(b). That is, the first and second pictures having an aspect ratio of 4:3 can be displayed in the CRT 67.

However, even if the ordinary picture of an NTSC (4:3) or two pictures can be displayed in the CRT of an aspect ratio of 16:9 when the conventional wide aspect television provided with a two pictures video processing circuit, there will be a disadvantage that the two pictures will be able to be displayed by only the video signal of an aspect ratio of 4:3 of the NTSC system in the current broadcast. That is to say, there will be a problem that the two pictures formed of the video signal having an aspect ratio of 4:3 of the NTSC, etc. and the video signal having an aspect ratio of 16:9 as of the hi-vision broadcast, etc. will not be able to be displayed together without horizontal and/or vertical distortion.

SUMMARY OF THE INVENTION

An object of the present invention is to provide a two pictures video processing circuit which can display two pictures having aspect ratios of 4:3 and 16:9 by using video signals having aspect ratios of 4:3 and 16:9.

Another object of the present invention is to provide a two pictures video processing circuit which realizes various picture displaying modes and is satisfactory to the users.

The present invention is a two pictures video processing circuit wherein a first picture having a first aspect ratio and a second picture having a second aspect ratio wider than the first aspect ratio can be simultaneously arranged and displayed in a wide aspect picture displaying part, the circuit comprising:

a video signal input means including a first video signal generating means and a second video signal generating means;

a first digital converting means converting a first video signal from said first video signal generating means to a digital signal;

a second digital converting means converting a second video signal from said second video signal generating means to a digital signal;

a first compressing means which is a means wherein a first digital signal from said first digital converting means is input, is compressed in the horizontal time axis and is output, includes a series arrangement of a first compressing circuit having a first compressing rate and a second compressing circuit having a second compressing rate and can output said input digital signal compressed in at least one compressing circuit of said first and second compressing circuits;

a first analog converting means converting the compressed digital signal from said first compressing means to an analog signal;

a second compressing means which is a means wherein a second digital signal from said second digital converting means is input, is compressed in the horizontal time axis and is output, includes a memory, writes said second digital signal into the memory and reads out by a timing signal produced from a synchronized signal of said first video signal and outputs a signal compressed at a predetermined compressing rate;

a second analog converting means converting a digital signal compressed from said second compressing means to an analog signal;

a synthesizing means synthesizing analog signals from said first analog converting means and second analog converting means and feeding them to said picture displaying part;

a controlling means wherein, in case the aspect ratios of said first video signal and said second video signal respectively approximate said firs aspect ratio, a signal compressed in the first compressing circuit will be output from said first compressing means, in case said first video signal approximates the first aspect ratio and said second video signal approximates the second aspect ratio, said first compressing means will be controlled to further compress in said second compressing circuit the signal compressed in said first compressing circuit and output it from said first compressing means and said second compressing means will be controlled to vary the compressing rate of said second compressing means in response to the input states of said first video signal and said second video signal; and a vertical amplitude variable means which can vary the amplitude in the vertical direction of the picture displayed in said picture displaying part.

In the formation of the present invention, when a video signal having an aspect ratio of, for example, 4:3 is fed by the first video signal generating means and a video signal having an aspect ratio of, for example, 16:9 is fed by the second video signal generating means, and a mode of displaying two pictures at such aspect ratios is directed by controlling means using the first and second compressing circuits, the digitalized first video signal will be compressed in the time axis at a compressing rate of, for example, 3/8 and the second video signal digitalized simultaneously with it will be written into a memory and will be read out on a delay of 3H/8 when compared with the first picture. Additionally, the video signal of the second picture will be controlled to be compressed in the time axis at a compressing rate, for example, of 5/8 by the controlling means. Thereafter, the first compressed video signal and the second compressed video signal will be converted as analog signals, synthesized in the synthesizing circuit, and fed to a cathode ray tube having an aspect ratio of 16:9 so that a corresponding two pictures display may be displayed. A two pictures display having obtained the optimum aspect ratios of 4:3 for the first picture and 16:9 for the second picture will be able to be realized, when the vertical deflecting current fed to the cathode ray tube is used to control the vertical amplitude via the deflecting means and controlling means.

BRIEF DESCRIPTION OF THE DRAWINGS

FIG. 2 (a) is a view showing the picture of a video signal having an aspect ratio of 4:3 and the picture of a video signal having an aspect ratio of 16:9 respectively at compressed rates of 3/8 and 5/8 in the horizontal direction.

FIG. 2 (b) is a view showing the picture of FIG. 2 (a) having a vertical amplitude compressed at a compressing rate of 1/2.

FIG. 2 (c) is a view showing the picture of FIG. 2 (a) having a vertical amplitude compressed at a compressing rate of 62.5%.

FIG. 4 (a) is a view showing a video signal having an aspect ratio of 4:3 displayed by the CRT having an aspect ratio of 16:9.

FIG. 4 (b) is a view showing the video picture of FIG. 4 (a) from the state of FIG. 4 (a) compressed horizontally at a compressing rate of 3/4.

FIG. 6 (a) is a view showing a video signal having an aspect ratio of 4:3 displayed by the CRT having an aspect ratio of 16:9 by means of two pictures display.

FIG. 6 (b) is a view showing the picture of FIG. 6 (a) having a vertical amplitude compressed at a compressing rate of 2/3.

DETAILED DESCRIPTION OF THE PREFERRED EMBODIMENTS

The preferred embodiments shall be explained with reference to the drawings.

Figure 1:
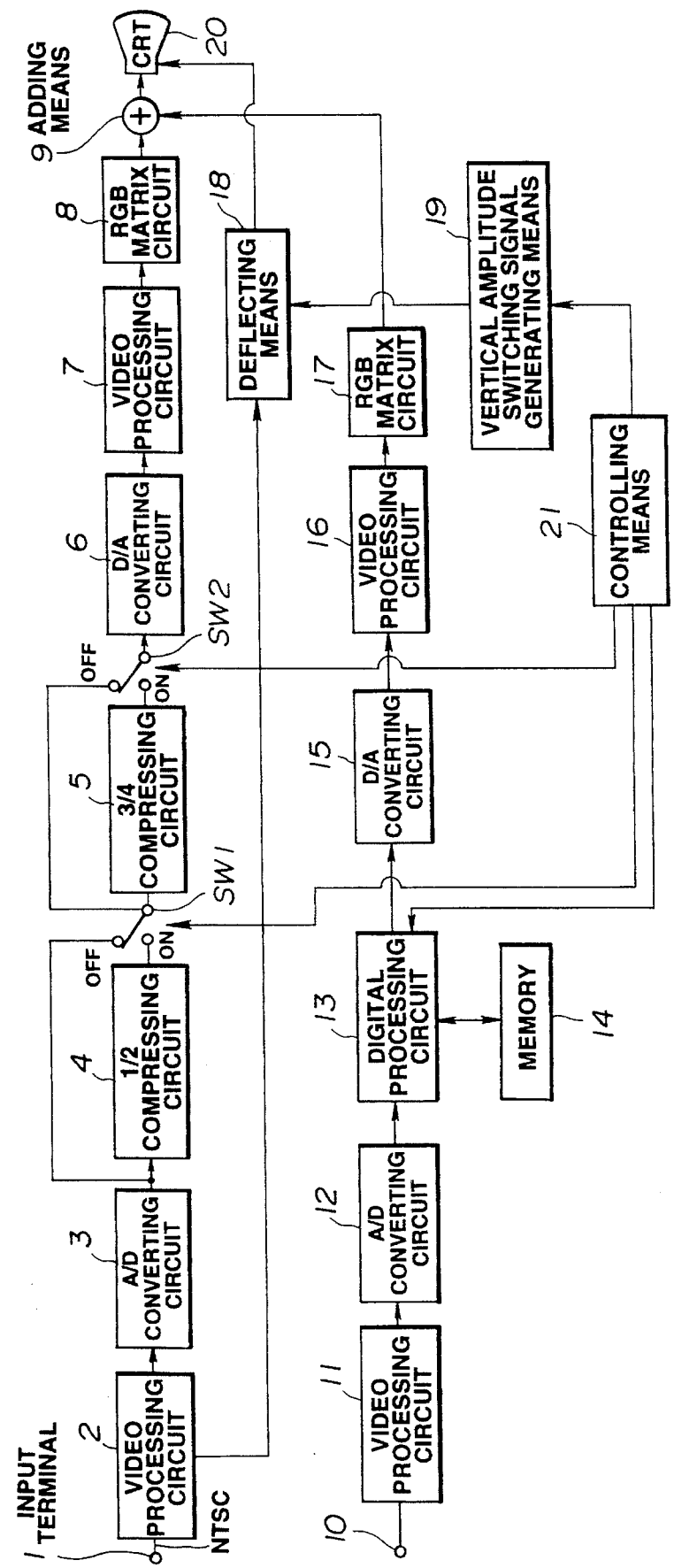
FIG. 1 is a block diagram showing an embodiment of a two pictures video processing circuit according to the present invention.

FIG. 1 is a block diagram showing an embodiment of a two pictures video processing circuit according to the present invention.

The wide aspect television of the embodiment shown in FIG. 1 is a wide aspect television having a two pictures displaying function, where a video signal having an aspect ratio of 4:3 of the current broadcast and a video signal having an aspect ratio of 16:9 of the hi-vision broadcast are used to display pictures of respectively different aspect ratios in a CRT having an aspect ratio of 16:9.

As shown in FIG. 1, the two pictures video processing circuit group is comprised mostly of two video processing circuits: a first video processing circuit (shown on the upper step) for displaying a parent/first picture, and a second video processing circuit (shown on the lower step) for displaying a son/second picture.

The video processing circuit shown on the lower step is generally a son picture video processing circuit for producing the second picture in the main first picture, for compressing the second picture video signal at a predetermined compressing rate, and for reproducing it as synchronized with the first picture.

Figure 5:
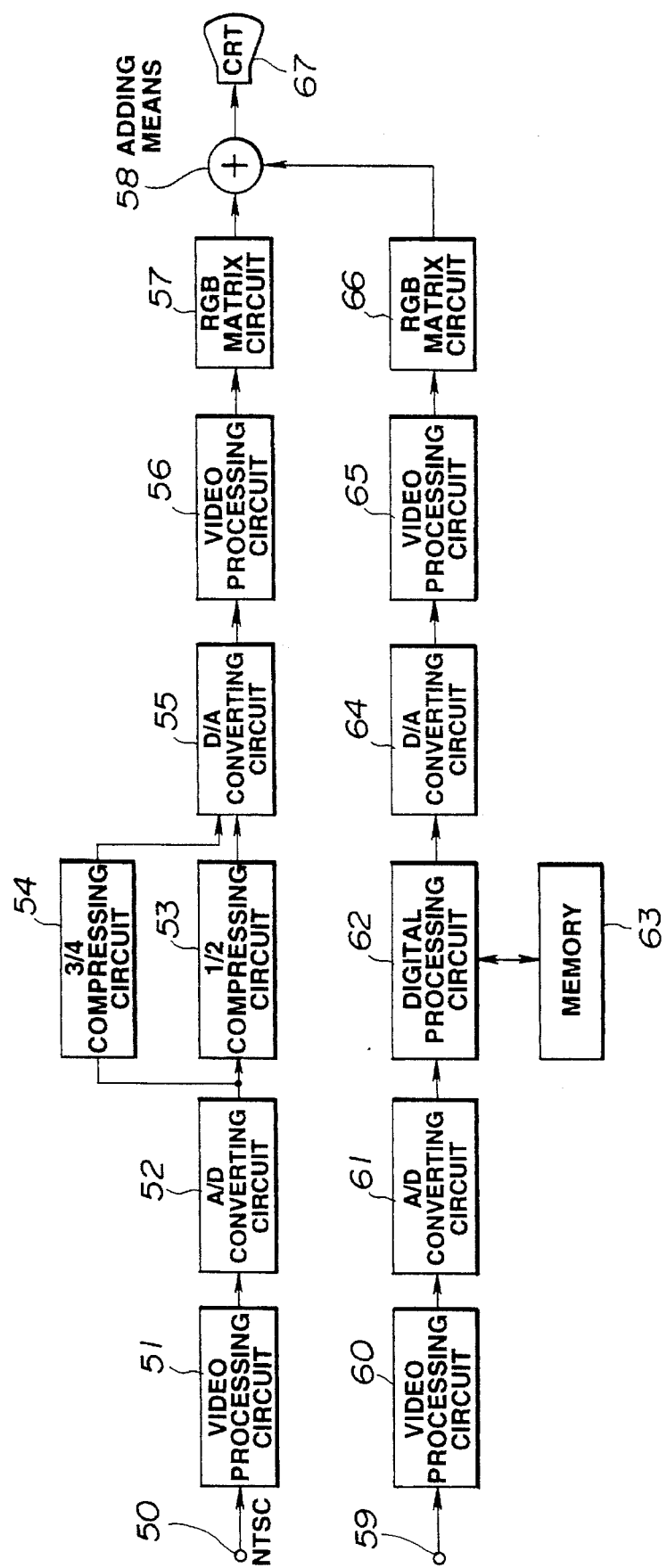
FIG. 5 is a block diagram showing an example of a wide aspect television having a conventional two pictures displaying function.

The video processing circuit formed on the upper step is formed of substantially the same components as the video processing circuit shown, for example, in FIG. 5. The differences are that the 1/2 compressing circuit 4 compressing in the time axis at a compressing rate of 1/2 and the 3/4 compressing circuit 5 are provided in series, and that the first switch SW1 and second switch SW2 are switched on/off by a controlling signal from the controlling means 21 those switches being connected to the respectively output terminals.

In FIG. 1, the first picture video processing circuit on the upper step shall be explained first. The reference numeral 1 represents an input terminal in which a broadcast signal, for example, of an NTSC system is input. The video signal input from this input terminal 1 is fed to a video processing circuit 2 comprising at least a video intermediate frequency amplifier, video wave detection circuit and synchronizing separating circuit (not illustrated), is converted to an intermediate frequency signal and is taken out. Then, this video signal is separated into a luminance signal Y (which shall be abbreviated as a Y signal hereinafter) and a chroma signal. The chroma signal is demodulated to color difference signals (R-Y, B-Y). The synchronous signal is taken out of the video signal and is fed, for example, to a deflecting means 18 for adjusting the vertical amplitude of the CRT 20. This deflecting means 18 generates a vertical deflecting current in response to the switching signal fed from the vertical amplitude switching signal generating means based on the synchronous signal from the video processing circuit 2. It feeds the vertical deflecting current to a deflecting yoke of the cathode ray tube 20 (which shall be mentioned as a CRT hereinafter) to adjust the vertical amplitude. Therefore, this deflecting means 18 is controlled by the controlling means 21.

The Y signal and color difference signals demodulated by the video processing circuit 2 are fed to the A/D converting circuit 3. Here, the analog Y signal and color difference signals are converted to digital signals. The output signal of this A/D converting circuit 3 is fed to the time axis 1/2 compressing circuit 4 for compressing the input signal at a compressing rate of 1/2. The output terminal of the A/D converting circuit 3 is in contact with the first switch SW1. The 1/2 compressing circuit 4 compresses digital signals at a compressing rate of 1/2 and is switched on/off by the switch SW1. Thus, when the output signal of the 1/2 compressing circuit 3 is output, circuit 4 may be by-passed.

The switch SW1 is connected to the 3/4 compressing circuit 5 for compressing in the time axis at a compressing rate of 3/4 and to the second switch SW2. When the output signal of the 3/4 compressing circuit 5 is output, circuit 5 may be by-passed by switching the switch SW on/off.

The switch SW2 is connected to the D/A converting circuit 6 by which the input digital signal is converted to an analog signal and fed to the video processing circuit 7.

The switching SW1 and SW2 are operated by the switching controlling signal from the controlling means 21. Using switching SW1 and SW2, the input digital signal compressing rate can be varied. Thus, available are a mode that the NTSC system picture having an aspect ratio of 4:3 is displayed by the controlling means 21, a mode that two ordinary pictures are displayed, and a mode that two pictures having aspect ratios of 4:3 and 16:9 may be displayed.

Then, the time compressed video signal is processed in the video processing circuit 7 as in an ordinary television receiver and RGB signals are produced by adding the respective color difference signals and Y signal using the matrix circuit 8, the output of which being fed to the adding means 9.

On the other hand, in the video processing circuit shown on the lower step for displaying the son/second picture receives, for example, a hi-vision signal (which shall be mentioned as a MUSE signal hereinafter) by a hi-vision broadcast via a MUSE decoder (not illustrated), the signal being input in the video signal input terminal 10. Or, a wide aspect of broadcast signal of HD-MAC or PAL Plus, etc. is demodulated and is input in the video signal input terminal 10. That is to say, the video signal of an aspect ratio of 16:9 is input in the video signal input terminal 10. When the video having an ordinary aspect ratio of 4:3 is displayed as the second picture, a video signal of the NTSC system will be input.

The video signal input from the input terminal 10 operates the same as the video signal input to the video signal processing circuit shown, for example, on the lower step in FIG. 5. The digital signal of the video of the second picture is fed to the digital processing circuit 13 through the video processing circuit 11 and A/D converting circuit 12, and is temporarily memorized in the digital memory 14.

A clock pulse is produced from the synchronized signal, for example, of the first picture and second picture in the digital processing circuit 13 and, for example, the digital memory 14 is written in or read from based on the timing of this clock pulse. That is to say, when reading out, the video signal of the second picture will be synchronized with the video signal of the first picture. When the picture is displayed as the second picture of an ordinary NTSC, it will be 1/2 compressed. When the video signal having a 16:9 aspect ratio of the wide aspect broadcast is displayed as the second picture, it will be compressed at a compressing rate of 5/8 and output. Digital processing circuit 13 can easily vary the compressing rate. The variability of the compressing rate of the digital processing circuit is controlled by the controlling means 21.

Figure 2A:
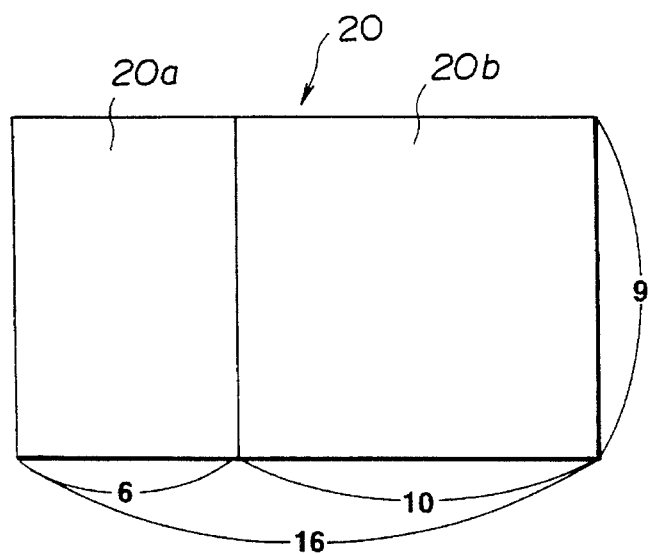
FIG. 2 (a) to 2 (c) are views showing the output displaying pictures of a CRT in case the two pictures video processing circuit shown in FIG. 1 is used.

The output signal of the digital processing circuit 13 is converted from the digital signal to an analog signal by D/A converting circuit 15, and is fed to the adding means 9 through the video processing circuit 16 and RGB matrix circuit 17. The first video signal and second video signal are added to each other by this adding means 9. When this added synthetic video signal is driven to the CRT 20 having an aspect ratio of 16:9, for example, the video of two pictures shown in FIG. 2(a) will be able to be displayed in the picture.

The operation of the two pictures video processing circuit of such formation shall be explained in detail in the following with reference to FIG. 2.

First of all, in a wide aspect television provided with the two pictures video processing circuit in this embodiment, when a video picture having an aspect ratio of 4:3 in an ordinary NTSC system is displayed in the CRT 20 picture, having an aspect ratio of, for example, 16:9, switches SW1 and SW2 shown in FIG. 1 will be configured to compress the input video signal at a compressing rate of 3/4. That is to say, the switch SW1 will be switched off and the switch SW2 will be switched on.

As a result, the input video signal will by-pass the 1/2 compressing circuit 4, will be fed to the 3/4 compressing circuit 5, will be compressed at a compressing rate of 3/4 in the 3/4 compressing circuit 5 and will be processed in the D/A converting circuit 6, video processing circuit 7 and RGB matrix circuit 8o A video having an aspect ratio of 4:3 will be able to be displayed in the picture in the CRT 20. Even in this case, when the vertical amplitude is adjusted via deflecting means 18 the same as in the conventional art, a normal video having an aspect ratio of 4:3 will be displayed in the picture.

Also, when the two pictures display having an aspect ratio of 4:3 in an ordinary NTSC system is made, it will be selected by using the switches SW1 and SW2 shown in FIG. 1 to compress the first picture input video signal at a compressing rate of 1/2. That is to say, the switch SW1 will be switched on and the switch SW2 will be switched off.

Figure 6:
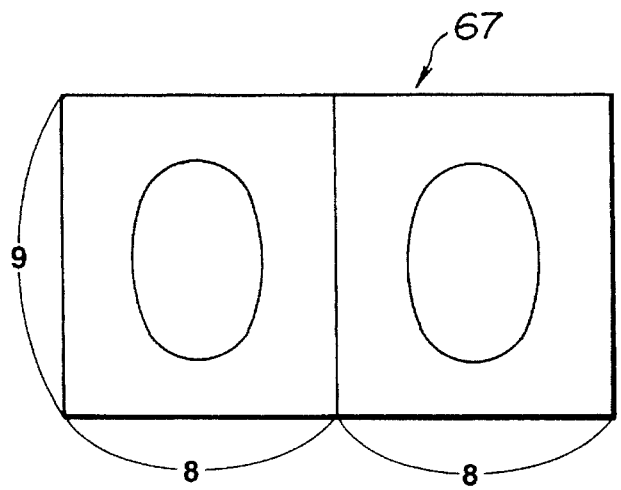
FIG. 6 (a) and 6 (b) are views showing the output displaying pictures when the picture is displayed by means of the two pictures displaying function shown in FIG. 5.
Figure 6:
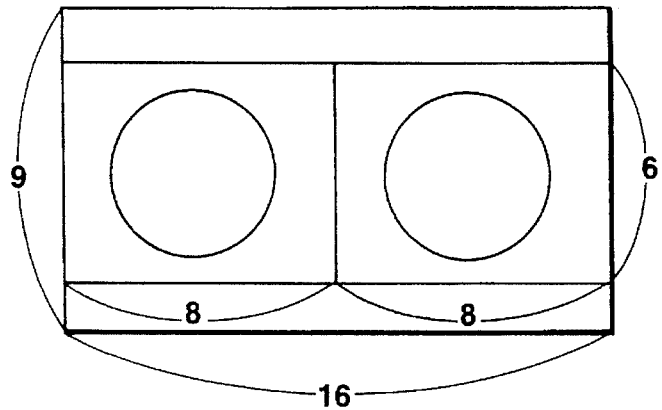

As a result, the input video signal will be fed to the 1/2 compressing circuit 4, will be compressed at a compressing rate of 1/2 in the 1/2 compressing circuit 4, will by-pass the 3/4 compressing circuit, will be processed as a signal in the D/A converting circuit 6, video processing circuit 7 and RGB matrix circuit 8, and will be fed to the adding means 9. On the other hand, a video signal having an aspect ratio of 4:3 in an ordinary NTSC system is input into the two pictures video processing circuit shown on the lower step in FIG. 1 and operates the same as in the conventional art shown in FIG. 5. That is to say, the video is made to lag by 1H/2 in the synchronization from the first picture video signal via digital processing circuit 13 and digital memory 14, is compressed at a compressing rate of 1/2, and is fed to the adding means 9 through the D/A converting circuit 15, video processing circuit 16 and RGB matrix circuit 17. Then, the first picture video signal and second picture video signal are added together by this adding means 9, this synthetic video signal is driven to the CRT 20 and the vertical amplitude is adjusted by deflecting means 18 so that such two pictures video of a normal aspect ratio of 4:3 as shown in FIG. 6(b) may be displayed in the picture.

Now, when the two pictures of the picture having an aspect ratio of 4:3 and the picture having an aspect ratio of 16:9 characterized in this embodiment is made, a video signal having an ordinary aspect ratio of 4:3 will be input into the input terminal 1 of the first picture video processing circuit on the upper step shown in FIG. 1 and a video signal having a wide aspect ratio of 16:9 will be input into the input terminal 10 of the second picture video processing circuit shown on the lower step.

In the first picture video processing circuit shown on the upper step, switching SW1 and SW2 shown in FIG. 1 are both selected to compress the first picture input video signal, for example, at a compressing rate of (1/2)×(3/4)=3/8. That is to say, the switch SW1 will be switched on the switch SW2 will be also switched on.

As a result, the input video signal will be fed to the 1/2 compressing circuit 4, the video signal compressed at a compressing rate of 1/2 in this 1/2 compressing circuit 4 will be fed to the 3/4 compressing circuit 5, and the output compressed signal of the 1/2 compressing circuit 4 will be again compressed at a compressing rate of 3/4. That is to say, the input video signal will be compressed at a compressing rate of 3/8 and will be output.

Then, the 3/8 compressed video signal will be processed in the D/A converter 6, video processing circuit 7 and RGB matrix circuit 8, and will be fed to the adding means 9.

On the other hand, in the two pictures video processing circuit shown on the lower step in FIG. 1, the input video signal of an aspect ratio of 16:9 is processed in the video processing circuit 11, is converted to be digital by means of the A/D converting circuit 12, and is fed to the digital signal processing circuit 13. There, the video signal is made to lag in the synchronization by 3H/8 from the first picture by means of the digital processing circuit 13 and digital memory 14, is compressed at a compressing rate of 5/8 by the control of the controlling means 21, and is fed to the adding means 9 through the D/A converting circuit 15, video processing circuit 16 and RGB matrix circuit 17. Then, the first picture video signal and second picture video signal are added together by means of this adding means 9. When this synthetic video signal is driven to the CRT 20, such two pictures display as is shown, for example, in FIG. 2(a), two pictures, for example, of the first picture 20a having an aspect ratio of 6:9 and second picture 20b having an aspect ratio of 10:9 will be able to be obtained.

Therefore, while such horizontal axis ratio of 6:10 of the first picture 20a and second picture 20b is held in the picture having an aspect ratio of 16:9 in the CRT 20, the aspect ratio of the first picture 20a and second picture 20b will be obtained as the optimum aspect ratio when the vertical amplitude is adjusted by using the deflecting means 18 on the basis of the switching signal from the vertical amplitude switching signal generating means 19 for the synchronous signal from the video processing circuit 2.

Figure 2B:
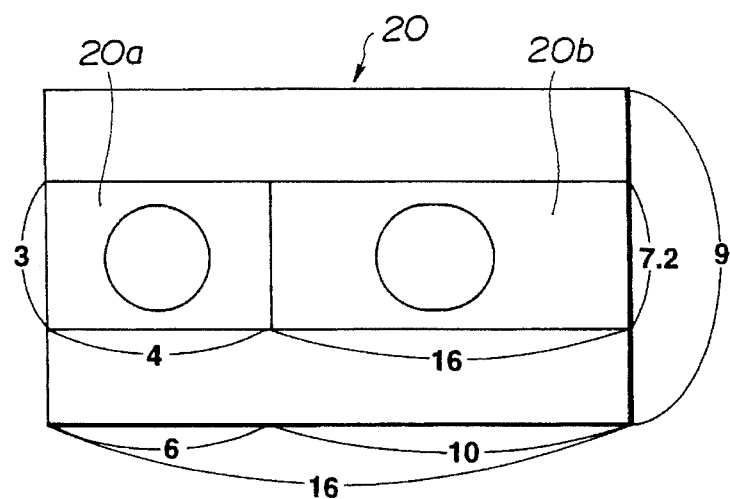

For example, in order that the first picture 20a may be a picture of a normal aspect ratio of 4:3 on which a video is to be displayed, the vertical amplitude by the deflecting means 18 is made 1/2. As a result, for example, as shown in FIG. 2(b), the aspect ratio of the first picture 20a will be a normal aspect ratio of 4:3 and the aspect ratio of the second picture 20b on this step will be 16:7.2, that is, the second picture 20b will be a somewhat horizontally long picture.

Figure 2C:
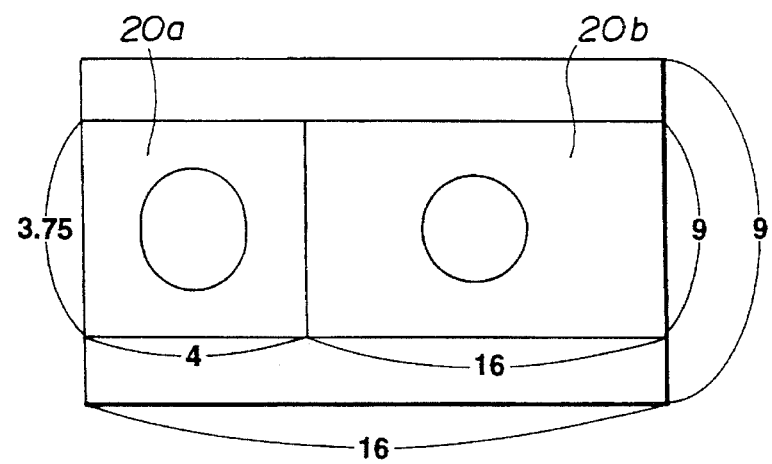
Figure 3:
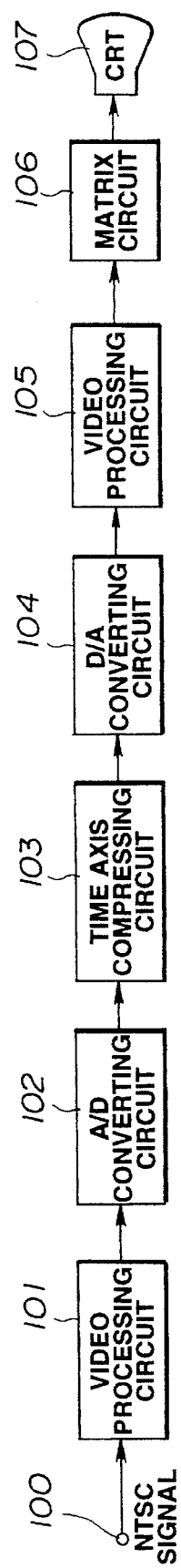
FIG. 3 is a block diagram showing an example of a video processing circuit of a conventional wide aspect television.
Figure 4A:
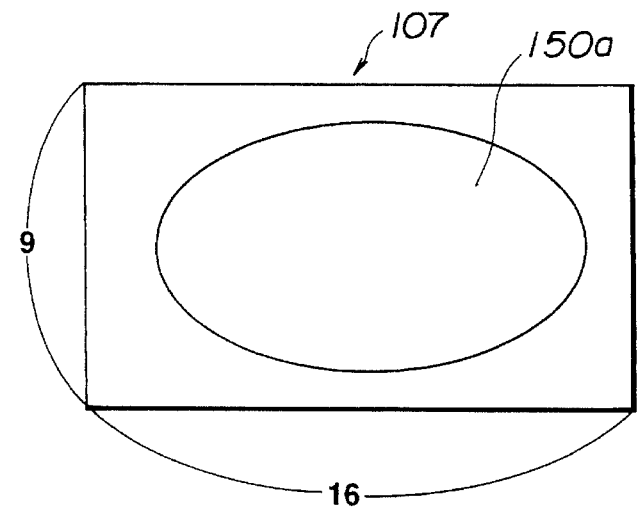
FIG. 4 (a) and 4 (b) are views showing the output displaying pictures of the CRT using the video processing circuit shown in FIG. 3.
Figure 4B:
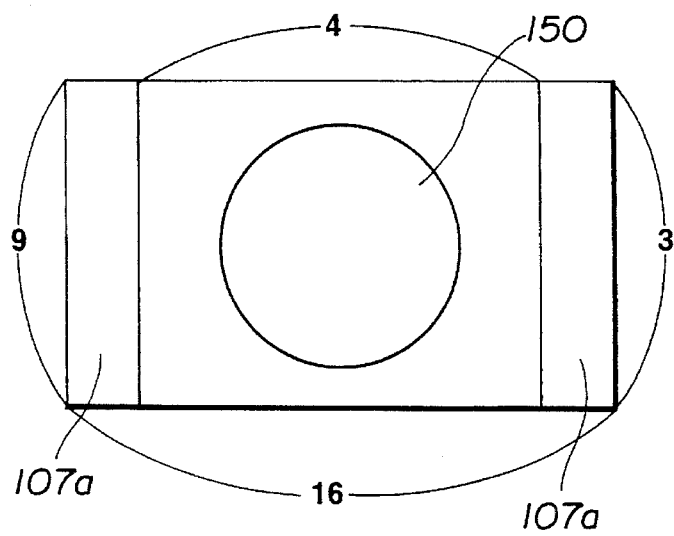

Also, in order that the second picture 20b may be a picture of a normal aspect ratio of 16:9 on which a video is to be displayed, the vertical amplitude by the deflecting means 18 is made 62.5%. As a result, the aspect ratio of the second picture 20b will be a normal aspect ratio of 16:9, for example, as shown in FIG. 2(c). On the other hand, the aspect ratio of the first picture 20a on this step will be 4:3.75. That is to say, the first picture 20a will be a more or less vertically long picture.

That is to say, if the vertical amplitude is adjusted, for example, by the deflecting means 18 to be 50 to 62.5%, a two pictures display having the optimum aspect ratio which the aspect ratio of the first picture approaches to 4:3 and the aspect ratio of the second picture approaches to 16:9 will be able to be made.

Therefore, according to this embodiment, in order to dissolve the problems in the conventional arts, the two pictures displayed formed of the current broadcast signal having the aspect ratio of 4:3 and the wide aspect broad signal is possible.

In this embodiment, as an example, it has been described that the signal obtained by demodulating the broadcast signal of the high vision broadcast via a MUSE decoder is input into the input terminal of the second picture producing video signal processing circuit. However, the MUSE decoder may be provided within the video processing circuit of the present invention.

Also, in this embodiment, it has been explained that the two pictures display is made at the respective aspect ratios by using the ordinary broadcast signal and the MUSE signal of the hi-vision broadcast. However, in the wide aspect television provided with the two pictures video processing circuit of the present invention, this invention is not limited to the MUSE signal. Other wide aspect broadcast signal than the MUSE signal can be received. It is evident that the users can select such various modes as a picture having an aspect ratio of 16:9, a picture having an aspect ratio of 4:3, and two pictures having aspect ratios of 4:3 and 16:9 with satisfaction.

Further, in this embodiment, the controlling means may be controlled to have the mode instantly changed. For example, the key operation of a key remote controlling transmitter may be used to change the mode. The controlling means may be formed so that various picture displays conforming to the objects of the users may be made.

According to this invention described above, with a simple formation, signals can be processed by using the video signals having the ordinary aspect ratio, the wide aspect ratio, and the respective pictures having aspect ratios of 4:3 and 16:9 can be simultaneously displayed. Thereby, in the wide aspect television provided with this two pictures video processing circuit, various picture displaying modes can be provided and videos satisfactory to the users can be supplied.

The present invention can be easily practiced with such simple formation as is mentioned above and can obtain the effect of the low cost.

Additionally, the present invention is not limited to only the above described embodiments but can be variously modified and worked without deviating from the subject matter of the invention.

What is claimed is:

1. A television receiver for simultaneously arranging and displaying a first picture having a first aspect ratio and a second picture having a second aspect ratio wider than said first aspect ratio in a wide aspect picture display, comprising:

video signal input means including a first video signal generating means and a second video signal generating means;

first digital converting means for converting a first video signal from said first video signal generating means into a first digital signal;

second digital converting means for converting a second video signal from said second video signal generating means into a second digital signal;

first compressing means including a series arrangement of a first compressing circuit having a first compressing rate and a second compressing circuit having a second compressing rate, said first compressing means receiving said first digital signal from said first digital converting means, compressing said first digital signal in a horizontal time axis at a first total compressing rate using at least one of said first compressing circuit and said second compressing circuit, and outputting a compressed first digital signal;

first analog converting means for converting said compressed first digital signal output from said first compressing means into a first analog signal;

second compressing means including a memory, said second compressing means receiving said second digital signal from said second digital converting means, compressing said second digital signal in the horizontal time axis at a third compressing rate based on said first total compressing rate, writing said compressed second digital signal into said memory, reading said compressed second digital signal from said memory based on a timing signal produced from a synchronized signal of said first video signal, and outputting said compressed second digital signal read from said memory;

second analog converting means for converting said compressed second digital signal output from said second compressing means into a second analog signal;

synthesizing means for synthesizing said first analog signal and said second analog signal, and for feeding a synthesized signal to said wide aspect picture display;

controlling means for controlling said first compressing means and said second compressing means when two pictures are simultaneously displayed in said wide aspect picture display;

deflecting means for scanning said wide aspect picture display based on said synchronized signal of said first video signal; and vertical amplitude variable means connected to said deflecting means for varying a vertical amplitude of a picture displayed in said wide aspect picture display, wherein said controlling means operates in a displaying mode when aspect ratios of said first video signal and said second video signal each has said first aspect ratio, said third compressing rate being the same as said first total compressing rate when said controlling means operates in said displaying mode.

2. A television receiver according to claim 1, wherein said first compressing rate of said first compressing circuit is 1/2 and said second compressing rate of said second compressing circuit is 3/4 when said first aspect ratio is 4:3 and said second aspect ratio is 16:9.

3. A television receiver according to claim 1, wherein said vertical amplitude varied by said vertical amplitude variable means changes based on said displaying mode.

4. A video processing circuit for displaying two video pictures comprising:

first demodulating means for demodulating a first received picture video signal to generate a first luminance signal, first color difference signals, and a first synchronous signal;

first digital converting means for converting a video signal output from said first demodulating means into a first digital signal;

compressing means for compressing said first digital signal, and for outputting compressed first digital signal, said compressing means including a 1/2 compressing circuit and a 3/4 compressing circuit connected in series, said 1/2 compressing circuit for compressing said first digital signal in a time axis of a horizontal direction at a compressing raze of 1/2, and said 3/4 compressing circuit for compressing said first digital signal in said time axis of said horizontal direction at a compressing rate of 3/4, at least one of said 1/2 and 3/4 compressing circuits being selected via first and second switches provided at output terminals of said 1/2 and 3/4 compressing circuits, respectively;

first analog converting means for converting said compressed first digital signal output from said compressing means into a first converted analog signal, and for outputting a first output picture video signal based on said first converted analog signal;

first matrix means for processing said first output picture video signal from said first analog converting means, for synthesizing said first luminance signal and said first color difference signals, and for outputting first RGB signals;

second demodulating means for demodulating a second received picture video signal to generate a second luminance signal, second color difference signals, and a second synchronous signal;

second digital converting means for converting a video signal output from said second demodulating means into a second digital signal;

a digital processing circuit for receiving said second digital signal from the second digital converting means, for writing said second digital signal into a memory based on said first synchronous signal and said second synchronous signal, for reading said second digital signal from said memory based on said first synchronous signal, for compressing said second digital signal at a predetermined compressing rate, and for outputting a compressed second digital signal;

second analog converting means for converting said compressed second digital signal into a second converted analog signal, and for outputting a second output picture video signal based on said second converted analog signal;

second matrix means for processing said second output picture video signal from the second analog converting means, for synthesizing the second luminance signal and the second color difference signals, and for outputting second RGB signals;

adding means for adding said first RGB signals and said second RGB signals and for outputting an added signal;

a cathode ray tube for displaying a picture based on said added signal with an aspect ratio of at least 16:9;

deflecting means for varying a vertical amplitude of said picture by controlling an amplitude of a vertical deflecting electric current fed to a deflecting yoke of said cathode ray tube based on said first synchronous signal; and controlling means for controlling said first and second switches of said compressing means, said predetermined compressing rate of said digital processing circuit, and said vertical deflecting current of said deflecting means based on a displaying mode.

5. A video processing circuit according to claim 4, wherein said first and second switches of said compressing means are switched and said compressing rate of said digital processing circuit is set to 5/8 when said first picture video signal is a video signal having an aspect ratio of 4:3 and said second picture video signal is a video signal having an aspect ratio of 16:9.

6. A video processing circuit according to claim 5, wherein said two video pictures divide a display with a ratio of 6:10 in the horizontal direction of the cathode ray tube.

7. A video processing circuit according to claim 5, wherein said respective aspect ratios of a first picture and a second picture can be adjusted to optimum aspect ratios when said vertical amplitude is adjusted by said deflecting means.

8. A video processing circuit according to claim 4, wherein said controlling means selects only said second switch of said compressing means and interrupts said compressed second digital signal output from said digital processing circuit when only said first picture video signal is to be displayed.

* * * * *